Dec. 15, 1964  J. KICKLITER  3,160,977
CAST NET CASTING DEVICE
Filed Aug. 28, 1963  3 Sheets-Sheet 1

Jesse Kickliter
INVENTOR.

BY
ATTORNEY

Dec. 15, 1964  J. KICKLITER  3,160,977
CAST NET CASTING DEVICE

Filed Aug. 28, 1963  3 Sheets-Sheet 2

Jesse Kickliter
INVENTOR.

BY R.T. Sperry
ATTORNEY

Dec. 15, 1964  J. KICKLITER  3,160,977
CAST NET CASTING DEVICE

Filed Aug. 28, 1963  3 Sheets-Sheet 3

Jesse Kickliter
INVENTOR.

BY *M. T. Sperry*
ATTORNEY

United States Patent Office 3,160,977
Patented Dec. 15, 1964

3,160,977
CAST NET CASTING DEVICE
Jesse Kickliter, Rte. 1, Box 44L, Ruskin, Fla.
Filed Aug. 28, 1963, Ser. No. 305,047
5 Claims. (Cl. 43—8)

This invention relates to mechanical means for the casting of fish nets or the like, and is particularly concerned with the casting of circular type nets generally characterized by the provision of peripherally arranged weights, and more specifically such nets as are commonly referred to as "cast nets." It will, of course, be understood that the primary concept herein set forth is in no way limited to the type of the net nor for the purpose for which it may be cast. The principles herein set forth and the mechanism herein employed may be widely utilized for purposes other than fishing.

As is well-known to those familiar with fishing by the use of cast nets, the peripheral edge of the circular net is usually engaged between the teeth of the caster at some elected point of the periphery of the net. Another point of the periphery of the net, spaced in counter-clockwise direction from the point held by the teeth, is held by the left hand of the caster to spread the net. The right, or casting hand, holds the periphery at a clockwise spaced point. By an outward arcuate flinging motion of the right hand, the net is cast so that centrifugal force will promote a circular spreading of the net as it is directed to the desired surface area of the water. Considerable strength, experience and dexterity is required in appropriately casting the net and in achieving a uniform wide spread of the periphery thereof. The distance from the caster which may be achieved in casting the net is limited and largely determined by the physical strength of the operator. Serious hazards are also involved in such casting, since lack of careful timing, bodily coordination, and balance, may result in serious bodily damage to the caster.

Figure 3:
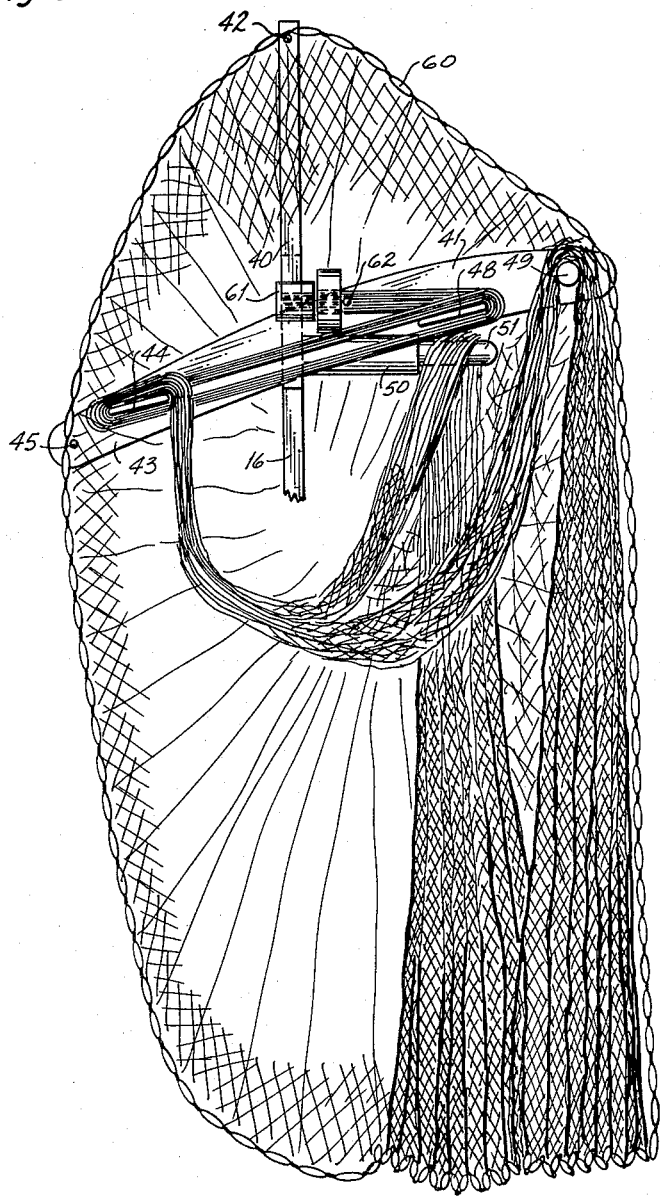
Figure 4:
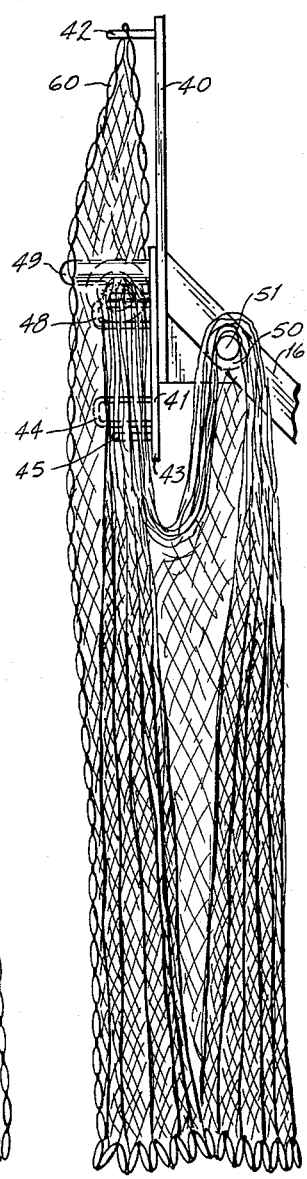
Figure 5:
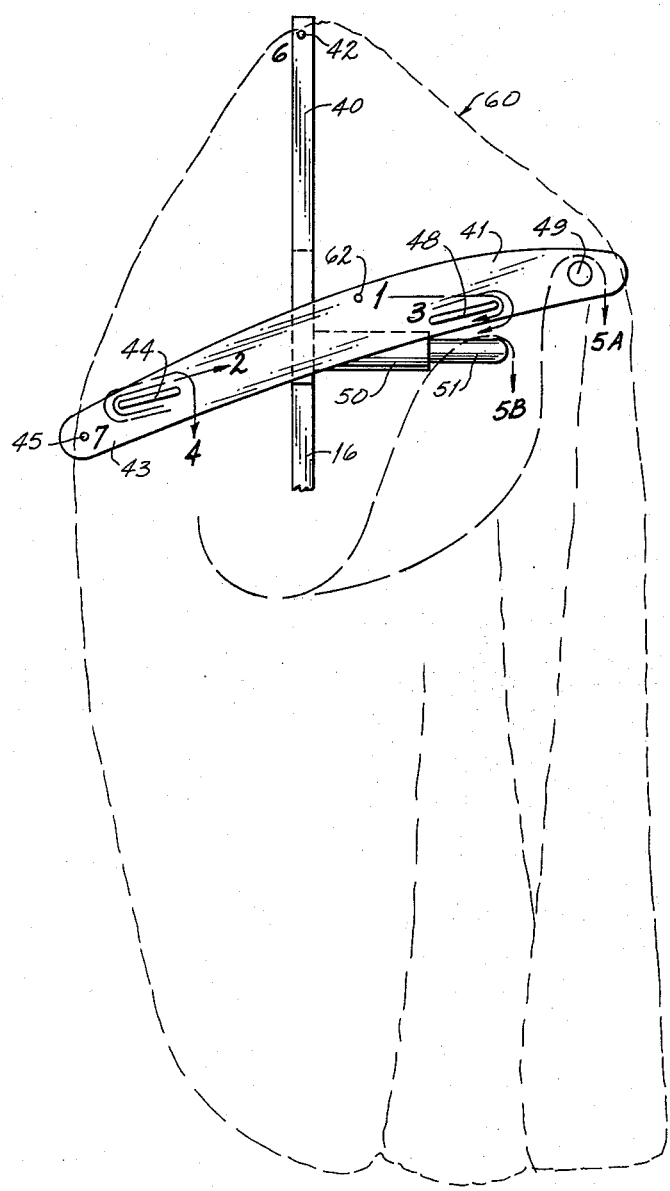
Figure 6:
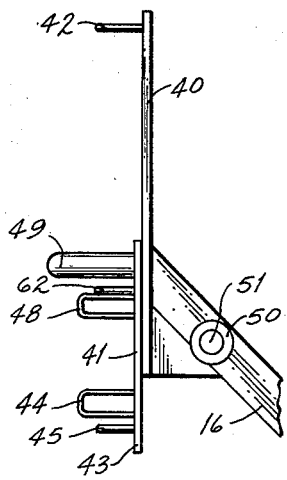

It is among the primary objects of the present invention to provide purely mechanical means for casting circular nets, particularly cast nets for fishing as hereinbefore referred to. It is also an object of the invention to provide mechanical net casting means by which the distance of the cast from the original position of the net may be considerably extended beyond that which normally may be achieved by human manipulation. Another object of the invention is to provide means by which a net may be accurately directed to a selected area without requiring skilled dexterity and experience by the user. Another object of the present invention is to provide a device of the character set forth which is simple in construction, readily operable, rugged and durable, and well designed to meet the demands of economic manufacture. Numerous other objects, features and advantages of the present invention will be apparent from consideration of the following specification, taken in conjunction with the accompanying drawings, in which FIG. 1 is a top plan view illustrating the present invention as mounted in the bow of a conventional small fishing boat, FIG. 2 is a side elevation of the apparatus of the present invention in the form shown in FIGURE 1, showing its mounting within the hull of the boat shown in FIGURE 1, FIG. 3 is a fragmentary front view of the present invention, showing the casting head with the cast net draped thereover in the manner hereinafter set forth, FIG. 4 is a side elevation showing the net draped in the manner of FIGURE 3, FIG. 5 is a front elevation of the empty casting head of the present invention illustrating the manner of draping the net, and FIG. 6 is a side elevation of the head as shown in FIGURE 5.

In the drawings, the bow of a conventional small fishing boat, such as may be rowed or propelled by a small outboard motor, is generally indicated by the numeral 10. Transversely disposed between sides 11 of the boat, and located in vertically spaced relation between the bottom 12 and the upper edges of the sides 11, is a pair of transverse support struts 13. At the center of the boat the struts 13 mount a bearing plate 14 through which is rotatably supported the integral vertical shank 15 of the net casting boom 16, which, as shown, is inclined from the axis of the shank 15. Below the plate 14 the shank 15 is provided with a rigidly attached actuating arm 17. It will be noted that the arm 17 lies at an angular offset from the boom 16 so that with the boom parallel with the beam of the boat the arm 17 inclines to the right. To the outer end of the arm 17 is secured as at 18 the inner end of a propelling spring 19. The forward end 20 of the spring 19 is secured to a cable 21, which passes over a pulley 22 mounted by a bracket 23 at the center of the forward point of the bow. From the pulley 22 the cable 21 extends rearwardly in a flight 24 to engage a winch drum 25 here shown as conveniently operated by hand by a lever 26 pivoted on a bracket 27 formed to extend vertically from the winch plate 28 supported by the struts 13. A ratchet arrangement of purely conventional form generally indicated at 29, operating between the lever 26 and the winch drum 25, provides for step by step rotation of the drum in counter-clockwise direction to tension the spring 19 by the cable 21.

The arm 17 extends outwardly and rearwardly from its engagement at 18 with the spring 19 terminating at 30. The end 30 is engageable within a recess 31 of a catch plate 32 pivoted as at 33 upon a rearward extension of the rear strut 13. This arrangement is such that as the boom is moved towards the rearwardly inclined central position, as indicated in FIGURE 1, the end 30 of the the arm will engage the nose of the plate to move it in a clockwise direction. Such clockwise motion is limited by the length of the cable 34. Such engagement by the restrained plate 32 prevents further clockwise pivotal movement of the boom as the spring is tensioned. The rearwardly extending end 32a of the catch plate is secured to the end of the cable 34 which passes therefrom over a pulley 35 mounted on the inner side of the boat. From the pulley 35 the cable 34 extends rearwardly to a drum 36 to which it is fixed. The drum is arranged to be moved in clockwise direction by the handle 37 to wind the cable 34 thereon, effecting counter-clockwise movement of the catch plate 32 to release the end 30 of the arm 17.

Figure 1:
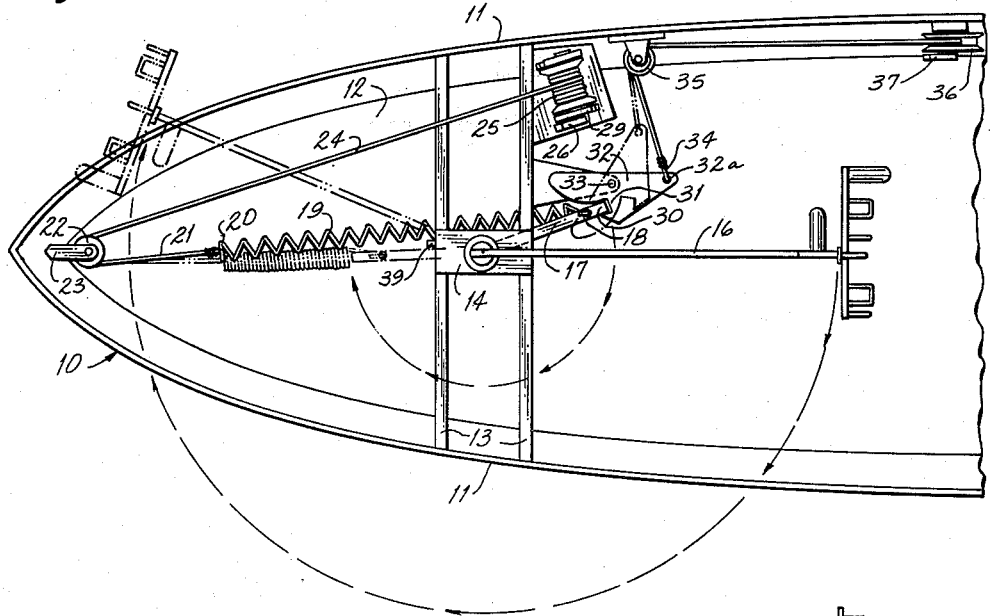
Figure 2:
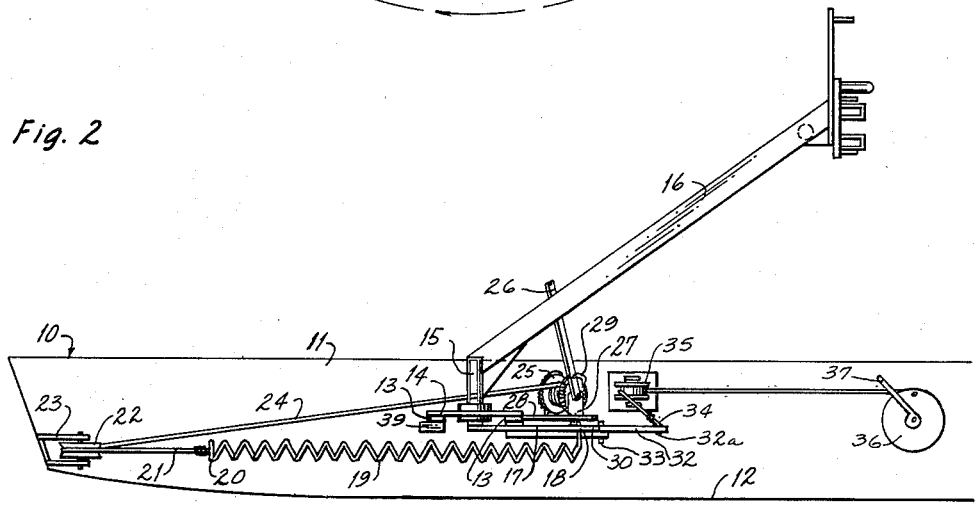

From the foregoing description, it will be seen that with the boom 16 in rearwardly ending central position, as shown in FIGURES 1 and 2, the arm 17 will be restrained by engagement with plate 32 held by cable 34 to retain this position of the boom while tension is applied by the spring 19. Such tension for cocking the boom is applied by winding the cable 24 on its drum 25 through repeated rearward strokes by the handle 26. It will be noted that since the point of attachment of the spring 19 to the arm 17, when the arm is engaged by the plate 32, is off center to the top of FIGURE 1, such tension would tend to rotate the boom in counter-clockwise direction. However, such motion would have to be accompanied by a further clockwise rotation of the plate which is precluded by the limited length of the cable 34. Therefore, full tension may be applied by the spring 19 without movement of the boom 16 or its arm 17.

To understand fully the position of the arm 17 and spring 19, it may be assumed that the device has a dead center axis extending amidships from the center 23 of the bow and through the boom portion 15. When the arm 17 is aligned along the dead center axis, it is also superposed directly over the spring 19 so that the spring and arm are coplanar. Thus, when the spring and arm are moved to the spring tensioned position shown in FIGURE 1, the arm 17 is moved beyond the dead center axis. As will be described hereinafter, operation of the lever 37 moves the arm back to the dead center axis whereat it is released from the recess 31.

With the spring fully tensioned, rearward oscillation of the lever 37 rotates the drum 36 to wind the cable 34 thereon, thus pivoting the plate in counter-clockwise direction towards the position indicated by the dotted lines in FIGURE 1. By such movement the end 30 of the arm 17 will be moved past dead center position whereupon the tension to the spring will cause an immediate, swift, pivotal movement of the boom in the direction indicated by the arrows of FIGURE 1, which movement may be terminated at any point desired by an adjustable stop indicated at 39. As will be hereinafter seen, the arcuate movement of the boom, terminated abruptly by arm 17 abutting against the stop 39, will cause the cast net to be flung from the head affixed to the end of the boom, to spread the net and discharge it at a desired location.

As more clearly depicted in FIGURES 3, 4, 5 and 6, the casting head, mounted on the outer end of the inclined boom 16 includes a pair of crossed hanger arms, including the vertical arm 40 and a transverse slightly tilted horizontal arm 41. At the top of the vertical arm 40 a suspension pin 42 is provided. On a lower extension 43 (to the left in FIGURE 3) of the horizontal arm 41, a looped support 44 is mounted together with a lower pin 45. A supporting loop 48 is mounted centrally of the right hand end of the arm 41 and at its extremity there is provided a hanger pin 49. The outer end of the boom 16 is provided with a transversly extending arm 50 which with a terminal extension 51 provides a support for a loop of the net. It will, of course, be understood that the arms 40 and 41 as well as the extension 50 and the pin 51 are all integrally connected and fixedly supported with the boom against relative motion with respect thereto.

In mounting the cast net, indicated by the numeral 60 in FIGURES 3 and 4, the terminal end of the brails of the net, with their junction collar at the inner ends thereof at 61, are engaged by the penetration therethrough of pin 62 at the inner portion of the arm 41 adjacent its mounting with arm 40. From this point, the brails extend to the right as shown in FIGURE 3 and in the direction indicated by the arrow number 1, in FIGURE 5, to pass over the loop 48 and thereunder to the left passing under the loop 44, as indicated by arrow 2. The brails then return over the loop 48 (arrow 3) and again over the loop 44 from which they drop downwardly (arrow 4) to divide as they engage with the periphery of the net about centrally of the axis of the arm 40. One portion of the net periphery is then hung over the hanger pin 49 (5A) while the other portion is suspended from pin 51 (5B). The left hand periphery of the net descending from pin 51 is lifted up and over the pin 42 of the arm 40 from which it descends over the net portion on pin 49 to unite with the periphery of that portion of the net descending therefrom.

By the above procedure of draping the net while the boom is in retracted position, it will be recognized that as the boom is released to act under spring tension, the weighted periphery will spin out under centrifugal force, and under the arcuate throwing force, to open the net. It is to be noted that the hanging pins and loops present little but frictional resistance to the discharge of the net therefrom, yet by virtue of the weights at the net periphery their spreading motion acts first to open the net and thereafter draw out the net body. Since the engagement of the brails by the pin 62 is of greater frictional resistance to discharge of the full net, the net will remain attached until the abrupt termination of boom swing by its engagement with the stop 39. Hence the operation may be "aimed" and the area to which the net is hurled may be pre-selected. The operation is a mechanized and improved replica of the conventional hand casting.

While the net draping on the presently presented arrangement of loops and pins has been found effective, efficient and practical, it is to be understood that the inventive concept is in no way limited to either this arrangement of net supports or to the draping techniques here presented by way of suggestion. Similarly, it is to be understood the details of mechanical construction here presented and the motivation suggested, is by way of example and that in the practice of the invention numerous changes, modifications and the full use of equivalents may be resorted to without departure from the spirit or scope of the invention as outlined in the appended claims.

What I claim is:

1. A cast net casting device comprising:

A rotatably mounted generally upstanding boom member adapted to support a cast net at the upper end thereof;

An actuating arm operatively connected to said boom member for rotation therewith;

Biasing means engaged with said actuating arm;

A rotatably mounted plate member having a recess therein;

Said plate member being mounted adjacent said boom member whereby said actuating arm is engaged within said recess and restrained against urging movement by said biasing means;

Release means operable to rotate said plate member to a position whereat said actuating arm is released from said recess whereupon said biasing means rotates said actuating arm and said boom member; and, Stop means mounted for engagement with at least a portion of said actuating arm whereby said rotation will be terminated and said cast net will be flung from said boom member in a selected and predetermined manner.

2. A cast net casting device as defined in claim 1 wherein said biasing means includes a spring member and manually operable means for preloading said spring member.

3. A cast net casting device as defined in claim 1 wherein said plate member is pivotally mounted and wherein said release means includes a manually operable means connected to said plate member at a location offset from its pivot mounting whereby operation of said manually operable means pivots said plate member about its pivot mounting.

4. A casting device for casting fishing nets in a prescribed and predetermined manner, said device comprising:

A boom means having a substantially vertical portion and an inclined portion extending angularly to said inclined portion;

A plurality of projections on the inclined portion of said boom means for supporting a draped fishing net;

Mounting means engaging said vertical portion for rotation of said boom means;

An actuating arm affixed to said vertical portion for rotation therewith;

Said actuating arm terminating in an outer end;

A spring member having one end thereof secured to said actuating arm outer end;

Manually operable tensioning means attached to the other end of said spring member for pulling said spring member away from said actuating arm outer end;

Said spring member and said actuating arm being capable of being superposed in a coplanar relationship with such a plane defining a dead center axis;

Said tensioning means being operative to move said arm to a position disposed at an angle beyond said dead center axis;

A pivotally mounted plate member;

said plate member having a recess therein which receives said actuating arm outer end when said tensioning means causes it to move beyond said dead center axis;

manually operable release means connected to said plate member for rotation thereof about its pivot mounting;

said plate member rotation moving said recess and thus said actuating arm until said actuating arm reaches said dead center axis whereupon further rotation of said plate member releases said actuating arm from said recess and allows said spring member to urge said actuating arm and said boom member into rotary motion; and an adjustably positioned stop member mounted for engagement with said actuating arm to terminate said boom member rotary motion and to thereby cast said draped fishing net from said boom in a preselected manner.

5. A net casting device comprising:
a first rotatably mounted means adapted to support a net thereon and having an arm projecting therefrom;
a second rotatably mounted means adjacent said first rotatably mounted means and having a recess therein;
a spring member having one end attached to said arm;
a first cable attached to the other end of said spring member and to a first manually operable winding means;
a second cable attached to an end of said second rotatably mounted means and to a second manually operable winding means;
said arm being movable to a set position whereat it is disposed within said recess;
said first manually operable winding means being operative to preload said spring member when said arm is in its set position;
said second manually operable winding means being operative to rotate said second rotatably mounted means and hence to thereby move said recess and said arm within said recess;
said second rotatably mounted means being movable by said second manually operable winding means to a release position whereat said arm is released from said recess;
said preloaded spring member being operative when said arm is released to rapidly rotate said first rotatably mounted means; and
a stop member interposed in the path of said first rotatably mounted means whereby when said means strikes said stop member, said net is cast therefrom.

References Cited by the Examiner

UNITED STATES PATENTS

| | | | |
|---|---|---|---|
| 296,247 | 4/84 | Stock | 124—8 |
| 938,861 | 11/09 | Heistand | 124—8 |
| 1,154,563 | 9/15 | Dorsey | 43—8 |
| 1,206,416 | 11/16 | Cosley | 124—8 |
| 1,867,578 | 7/32 | Lorimer | 124—8 |
| 2,891,342 | 6/59 | Grable et al. | 43—8 |

ABRAHAM G. STONE, *Primary Examiner.*

F. RAY CHAPPELL, *Examiner.*